US011045365B2

(12) United States Patent
Molinaro et al.

(10) Patent No.: US 11,045,365 B2
(45) Date of Patent: Jun. 29, 2021

(54) LIFT APPARATUS

(71) Applicant: Olmedo Special Vehicles S.p.A., Ghiardo di Bibbiano (IT)

(72) Inventors: Daniele Molinaro, Rovereto (IT); Emanuele Mengoni, Rovereto (IT)

(73) Assignee: Olmedo Special Vehicles S.p.A., Ghiardo di Bibbiano (IT)

( * ) Notice: Subject to any disclaimer, the term of this patent is extended or adjusted under 35 U.S.C. 154(b) by 0 days.

(21) Appl. No.: 16/467,998

(22) PCT Filed: Dec. 6, 2017

(86) PCT No.: PCT/IT2017/050002
§ 371 (c)(1),
(2) Date: Jun. 10, 2019

(87) PCT Pub. No.: WO2018/104978
PCT Pub. Date: Jun. 14, 2018

(65) Prior Publication Data
US 2019/0298592 A1 Oct. 3, 2019

(30) Foreign Application Priority Data

Dec. 9, 2016 (IT) .......................... 102016000124657

(51) Int. Cl.
*A61G 3/06* (2006.01)
*B60P 1/44* (2006.01)
(52) U.S. Cl.
CPC ............ *A61G 3/062* (2013.01); *B60P 1/4414* (2013.01); *B60P 1/4442* (2013.01); *Y10S 414/134* (2013.01)
(58) Field of Classification Search
CPC ...... A61G 3/062; B60P 1/4414; B60P 1/4442; Y10S 414/134
(Continued)

(56) References Cited

U.S. PATENT DOCUMENTS 4,408,948 A * 10/1983 Robinson ............... B60P 1/4421
187/243
6,379,102 B1 * 4/2002 Kameda .................... A61G 3/06
414/546
(Continued)

FOREIGN PATENT DOCUMENTS

CN 103735372 4/2014
EP 2253441 11/2010
(Continued)

OTHER PUBLICATIONS

International Search Report and the Written Opinion dated Apr. 10, 2018 From the International Searching Authority Re. Application No. PCT/IT2017/050002. (14 Pages).
(Continued)

*Primary Examiner* — James Keenan (57) ABSTRACT

A lift apparatus includes an anchor assembly fixable to a vehicle; a platform to support a wheelchair; a support assembly; and two arms, each connected to the support assembly to support the platform. The arms are rotatably connected to the anchor assembly. The platform includes two parts. Each part has a support surface for a wheelchair, a back, and a lateral edge along which the parts are hinged to rotate between a close configuration, in which the backs are facing, and an open configuration, in which the support surfaces are coplanar. An actuator rotates the parts from the close configuration to the open configuration. For each arm, a connecting element, is pivoted to the arm; a first connecting rod is pivoted to the connecting element and to a first of the parts, and a second connecting rod is pivoted to the connecting element and to the second of the parts.

10 Claims, 5 Drawing Sheets

(58) Field of Classification Search
USPC .................................. 414/546, 921
See application file for complete search history.

(56) References Cited

U.S. PATENT DOCUMENTS

| | | | | |
|---|---|---|---|---|
| 7,445,416 B2* | 11/2008 | O'Leary | ............... | B60P 1/4442 |
| | | | | 414/546 |
| 9,149,397 B2* | 10/2015 | Gallingani | ............... | A61G 3/06 |
| 9,974,702 B2* | 5/2018 | Gallingani | ............. | A61G 3/063 |
| 2006/0263183 A1* | 11/2006 | Goodrich | ................ | A61G 3/06 |
| | | | | 414/471 |

FOREIGN PATENT DOCUMENTS

| | | | | |
|---|---|---|---|---|
| EP | 2716267 | | 4/2014 | |
| EP | 2818148 | | 12/2014 | |
| JP | 57-186542 | | 11/1982 | |
| WO | WO-03059685 A2 * | | 7/2003 | ............ B60P 1/4442 |
| WO | WO 2018/104978 | | 6/2018 | |

OTHER PUBLICATIONS

Rapporto di Recerca e l'Opinione Scritta Dated Jul. 28, 2017 From the Minstero di Sviluppo Economico, Direzione Generale Sviluppo Produttivo e Competitivita, Uffico Italiano Brevetti e Marchi Re. Application No. IT201600124657. (11 Pages).

\* cited by examiner

LIFT APPARATUS

RELATED APPLICATIONS

This application is a National Phase of PCT Patent Application No. PCT/IT2017/050002 having International filing date of Dec. 6, 2017, which claims the benefit of priority of Italian Patent Application No. 102016000124657 filed on Dec. 9, 2016. The contents of the above applications are all incorporated by reference as if fully set forth herein in their entirety.

FIELD AND BACKGROUND OF THE INVENTION

The present invention relates to a lift apparatus.

In particular, the present invention refers to a lift apparatus, specially adapted for lifting a wheelchair, installable in a vehicle to facilitate the ascent or descent of a user or of a wheelchair on/from the vehicle or for the loading or unloading of goods from the latter.

A first apparatus known, today, for lifting wheelchairs and facilitating their ascent or descent on/from a vehicle, comprises two arms hinged to the opposite sides of the floor of a vehicle and carrying a platform at their free end.

These arms are configured in such a way that when they are operated they move the platform between:

an unloading position, in which, it is placed on the ground external to the vehicle and at a level lower than the floor of the vehicle;

a boarding position, in which the platform is coplanar with the vehicle floor.

These arms are configured in such a way that during the passage between said positions, the platform is translated, without rotating, so as to always remain horizontal.

A second known apparatus nowadays comprises a platform cantilevered articulated to a guide mechanism configured to translate the platform from the floor level of the vehicle to that of the ground and vice versa, and to rotate the platform between a rest position, in which the platform is substantially vertical and an operating position in which it is substantially horizontal to support a wheelchair.

A drawback of these traditional apparatuses is that they are often cumbersome and structurally complex.

In particular, the first apparatus described requires a high depth of the vehicle compartment adapted to receive the wheelchair, since it must accommodate the entire platform.

The second apparatus described, although when it is at rest is compact, however, it is structurally complex as it requires dimensioned components to support the platform with a wheelchair on it, during the unloading or loading movements of the latter.

The problem underlying the present invention is that of increasing the simplicity and efficiency, also reducing the overall size, of the lift apparatus for a known wheelchair.

SUMMARY OF THE INVENTION

The aim of the present invention is to provide a lift apparatus for a wheelchair which provides a solution to this problem by solving the complaints of the aforementioned lift apparatus for a wheelchair described above.

Within this aim, it is an object of the present invention to provide a lift apparatus for a wheelchair which is more compact and, at the same time, dynamically balanced than traditional apparatus.

Another object of the present invention is to provide a lift apparatus for a wheelchair which, with the same overall size when at rest, allows the loading and unloading of wheelchairs larger than the traditional apparatus.

Another object of the invention is to provide a lift apparatus for a wheelchair which has a wider platform with respect to the traditional apparatus, with the same overall size in the rest configuration.

This task, as well as these and other objects which will become better apparent hereinafter, are achieved by a lift apparatus for a wheelchair according to the attached claim 1.

Detailed features of a lift apparatus for a wheelchair according to the invention are given in the corresponding dependent claims.

BRIEF DESCRIPTION OF THE SEVERAL VIEWS OF THE DRAWINGS

Further characteristics and advantages of the invention will become better apparent from the description of a preferred but not exclusive embodiment of a lift apparatus for a wheelchair according to the invention, illustrated by way of non-limiting example in the accompanying drawings, wherein.

DESCRIPTION OF SPECIFIC EMBODIMENTS OF THE INVENTION

With particular reference to the aforementioned figures, it is generally indicated with 10 a lift apparatus, for example for a wheelchair, which, in a way, per se, traditional, comprising:

at least an anchor assembly 11 fixable to the frame of a vehicle, for example of brackets possibly joined by a plate, fixable to the floor of the compartment of a vehicle to be equipped with the lift apparatus 10;

a platform 12 apt to support a wheelchair;

at least one support assembly 13 mechanically connected to the platform 12;

two arms 14, each connected to the support assembly 13 to support the platform 12.

The arms 14 are rotatably connected to the anchor assembly 11, to rotate with respect to the latter between a rest configuration and an operating configuration.

The arms are configured in such a way that, when the lift apparatus 10 is mounted on a vehicle, in the rest configuration, they extend substantially vertically from the floor of the vehicle compartment in which they are installed and, in the operating configuration, extend outwards the compartment to support the platform outside the vehicle and place it on the ground in order to load a wheelchair.

The arms 14 are advantageously specular, one with respect to other and rotatable with respect to the anchor assembly 11 with respect to a common axis of rotation A.

The arms 14, preferably, constitute each of a deformable parallelogram mechanism operated by an actuator 141 preferably hydraulic, which extends along a diagonal of the deformable parallelogram mechanism.

In accordance with the present invention, a lift apparatus 10 has a particular peculiarity in that the platform 12 comprises two parts 121, 122 of which each has a support surface 121a, 122a for a wheelchair, a back 121b, 122b, opposite to the support surface 121a, 122a and a lateral edge 121c, 122c along which the parts 121, 122 are mutually hinged to rotate mutually between a close configuration, in which the backs 121b, 122b are facing each other, and an open configuration in which the support surfaces 121a, 122a are substantially coplanar to define a support plane for a wheelchair.

Figure 1:
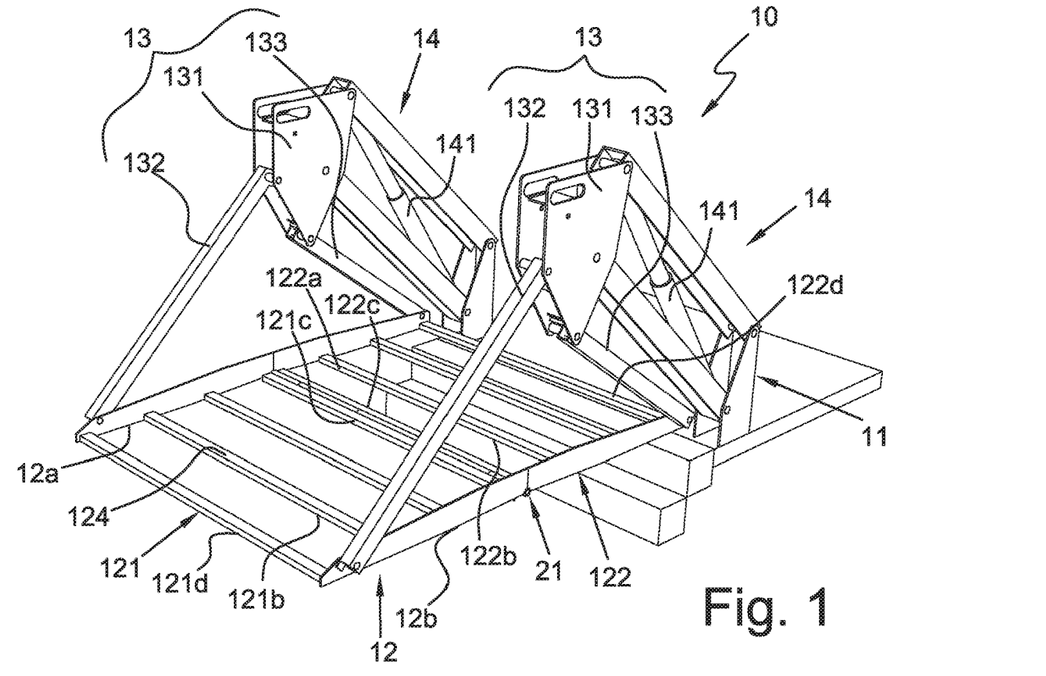
FIG. 1 illustrates a lift apparatus for a wheelchair according to the present invention in a perspective view with the platform in the open configuration.
Figure 2:
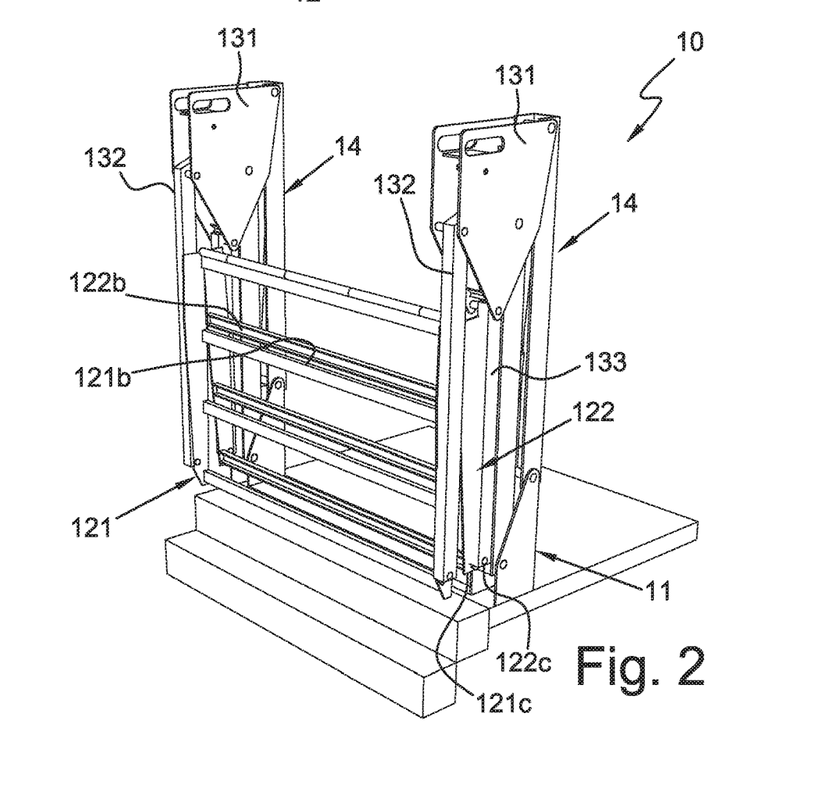
FIG. 2 illustrates a lift apparatus for a wheelchair according to the present invention in a perspective view with the platform in the closed configuration.
Figure 3A:
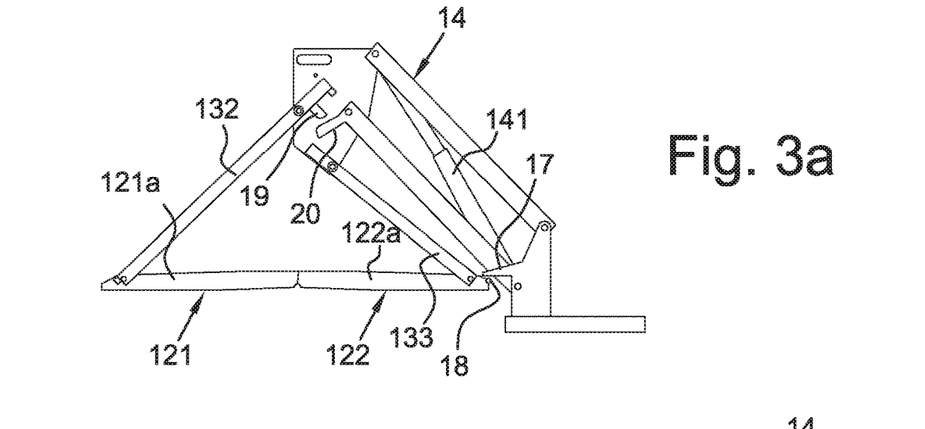
FIGS. 3a, 3b, 3c and 3d schematically illustrate a lift apparatus for a wheelchair according to the present invention in various operating configurations.
Figures 3B, 3C, 3D:
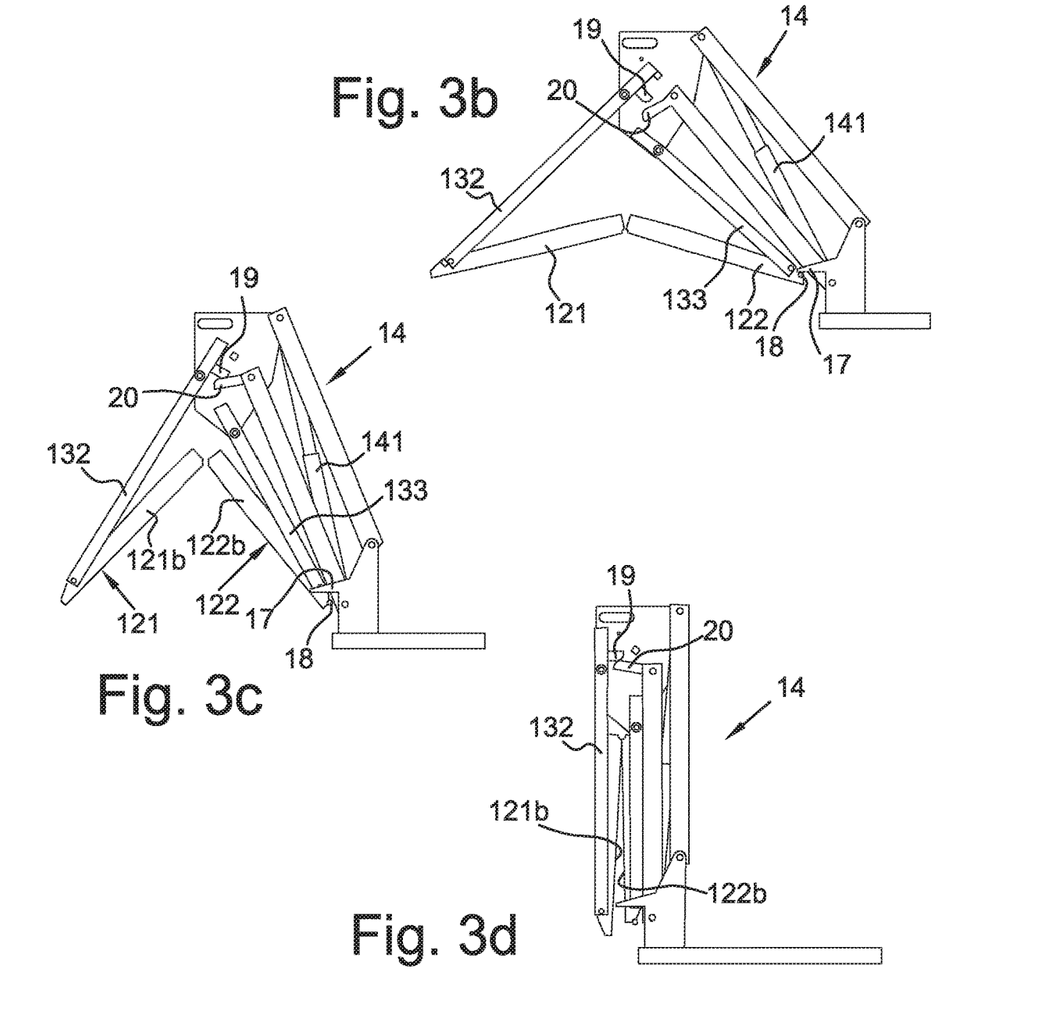

By way of non-limiting example, in FIG. 1 shows the platform 12 in the open configuration and in FIG. 2 is in the close configuration.

Moreover, according to the present invention, the apparatus comprises actuating means to mutually rotate the parts 121, 122 of the platform 12 from the close configuration to the open configuration and vice versa.

The support assembly 13 comprises, for each arm 14:
a connecting element 131, pivoted to the arm 14;
a first connecting rod element 132 pivoted to the connecting element 131 and to a first part 121 of the parts 121, 122;
a second connecting rod element 133 pivoted to the connecting element 131 and to the second part 122 of the parts 121, 122.

The connecting rod elements 132, 133 are mutually joined when the platform 12 is in the close configuration and are separated from each other when the platform 12 is in the open configuration.

A lift apparatus according to the present invention therefore allows to support from above the platform in a way balanced from the point of view of the moment of the weight force of the platform so that when a wheelchair is loaded, the moment of the body weight of the latter is minimized and the stresses exerted on the arms is minimal from the point of view of a tilting moment of the platform.

This allows to contain the dimensions of the components of a lift apparatus according to the present invention with respect to the traditional apparatus.

Preferably, the connecting rod elements 132 and 133 are pivoted to the corresponding parts 121 and 122 of the platform 12 along the sides 12a and 12b of the latter and preferably near the external edges 121d and 122d of the parts 121 and 122, where the external edges 121d and 122d are opposite the lateral edges 121c and 122c of the respective parts 121 and 122.

Preferably, the parts 121 and 122 are substantially rectangular or square and the sides 12a and 12b are perpendicular or at least transverse to the edges 121c, 122c, 121d, 122d.

Said actuating means are advantageously configured to mutually rotate the parts 121, 122 of the platform 12 from the close configuration to the open configuration following a rotation of the arms 14 from the rest configuration to the operating configuration and from the open configuration to the close configuration following a rotation of the arms 14 from the operating configuration to the rest configuration.

Figure 4:
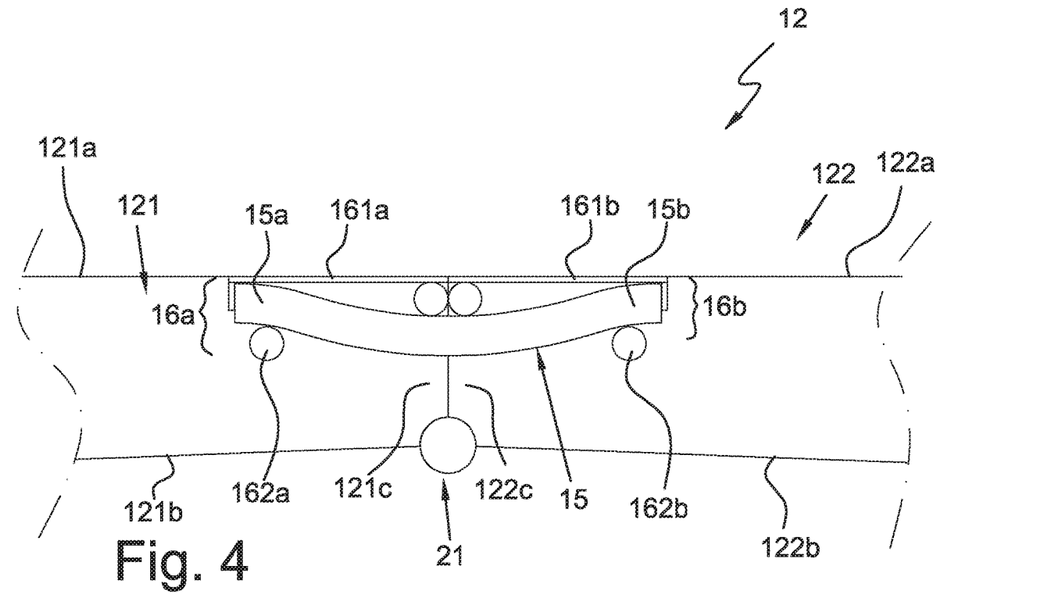
FIGS. 4 and 5 illustrate an enlarged and schematized detail of a lift apparatus for a wheelchair according to the present invention.
Figure 5:
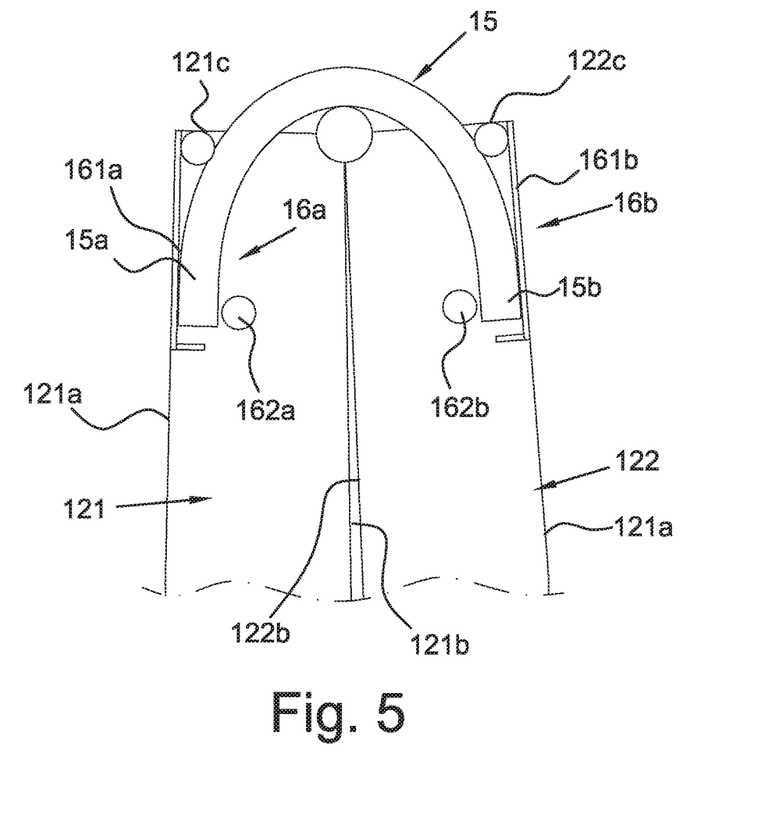

Structurally, said actuating means could comprise pneumatic or hydraulic actuators but, in an embodiment, particularly preferable for its simplicity and reliability, they advantageously comprise at least an elastic element 15 mechanically connected to each of the parts 121, 122 such that, when the platform 12 is in the close configuration, the elastic element 15 is in a first charged configuration, like the example shown schematically in FIG. 5, and, when the platform 12 is in the open configuration, the elastic element 15 is in a second charge configuration, for example visible in FIG. 4.

The elastic element 15, when it is in said first charged configuration, is elastically deformed in such a way as to exert an elastic force on the parts 121, 122, designed to promote its passage to the open configuration.

On the contrary, when the elastic element 15 is in said second charged configuration, it is elastically deformed so as to exert an elastic force on the parts 121, 122 to promote its passage in the close configuration.

In a greater detail, the elastic element 15 preferably comprises a rod or plate having two ends 15a, 15b each of which is inserted in one of two corresponding seats 16a, 16b, a first 16a of which is provided on a first 121 of the parts 121, 122 of the platform 12 and the second 16b being provided on the second 122 of the parts 121, 122 of the platform 12.

The seats 16a, 16b having first 161a, 161b and second 162a 162b abutment elements arranged in such a way that said rod or plate pushes against the first abutment elements 161a 161b, when it is in said first charged configuration and pushes against the second abutment elements 162a 162b when it is in said second charge configuration.

Advantageously, the lift apparatus 10 comprises means for compacting the parts 121, 122 of the platform 12 to the arms 14 when the parts 121, 122 are in said close configuration and the arms 14 are in said rest configuration.

In detail, said means for compacting advantageously comprise at least one elastic pin, not shown, fixed to at least one of the arms 14 and protruding from it to engage an abutment seat provided on at least one of the first connecting rod elements 132.

When the parts 121, 122 are in said close configuration and the arms 14 are in said rest configuration, said elastic pin is advantageously elastically deformed and exerts on the first connecting rod element 132 a force able to push it against the second connecting rod element 133 to push the parts 121, 122 in said close configuration.

In an alternative and preferred, albeit non-exclusive, embodiment of the present invention, the means for compacting advantageously comprise at least a first appendix 17 projecting from at least one of the arms 14 and at least a second appendix 18 projecting from at least one of the parts 121, 122 of the platform 12.

Preferably, the first appendix 17 comprises a pivot projecting laterally from the part 122 which is the closest to the arm 14 and the second appendix 18 extends from the arm 14 near one of its extremes pivoted to the anchor assembly 13.

The first 17 and the second appendix 18 are advantageously configured and positioned in such a way that, in use, during the passage of the arm 14 from said operating configuration to said rest configuration, the first 17 and the second appendix 18 interfere to exercise on the platform 12 a force to mutually rotate the parts 121, 122 of the platform 12 to promote the passage of the latter from the open configuration to the close configuration.

Said means for compacting preferably also comprise at least a third appendix 19, projecting from at least a first 132 of the connecting rod elements 132, 133, and a fourth appendix 20 projecting from at least one of the arms 14.

In detail the third 19 and the fourth appendix 20 are advantageously configured and positioned in such a way that, during use, during the passage of the arm 14 from the operating configuration to the rest configuration, the third 19 and the fourth appendix 20 mutually interfere so that, when the arms 14 are in the rest configuration, the backs 121b, 122b of the parts 121, 122 of the platform 12 abut one on the other.

In particular, the third and fourth appendages 19 and 20 extend from the ends respectively of the first connecting rod element 132, which is the one, most distant from the arm 14, and of the arm 14.

These ends are pivoted to the connecting element 131.

Advantageously, the connecting element 131 of the support assembly 13, in use, is positioned above the sides 12a, 12b of the platform 12 to support it from above.

In this way, between the two connecting elements 131 there is the space for loading a wheelchair for which these connecting elements act as lateral containment elements.

The support assembly 13 is advantageously configured in such a way that, in use, the weight force of the platform 12 exerts a substantially zero resulting moment on the support assembly 13.

Advantageously, the connecting element 131, in use, is intersected by a vertical plane passing through the center of gravity of the platform 12 so as to support it from the top, in a way balanced.

The lift apparatus 10 preferably comprises a hinge 21 fixed to the edges of the parts 121, 122 of said platform 12; the connecting element 131, in use, is preferably intersected by a vertical plane passing through the hinge 21.

Figure 6:
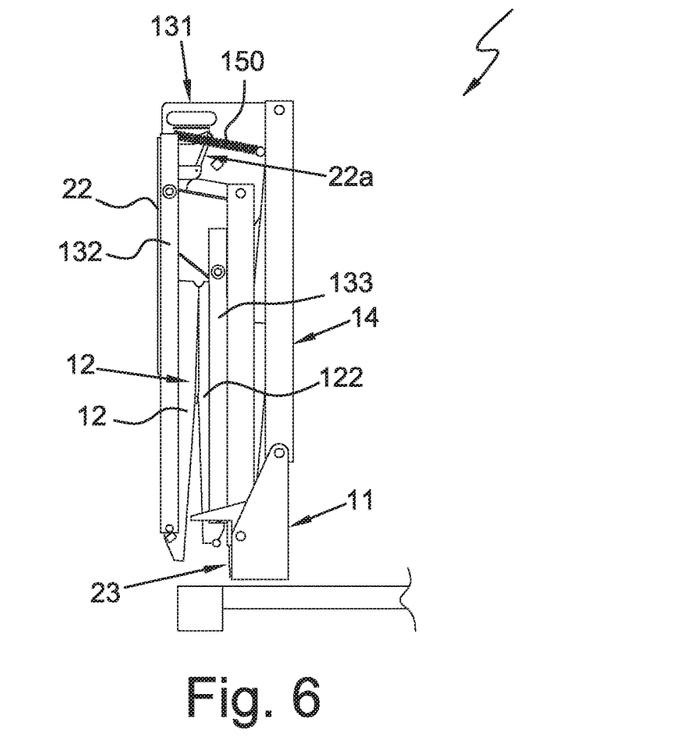
FIG. 6 illustrates a variant embodiment of the lift apparatus illustrated in the previous figures, in a closed configuration.
Figure 7:
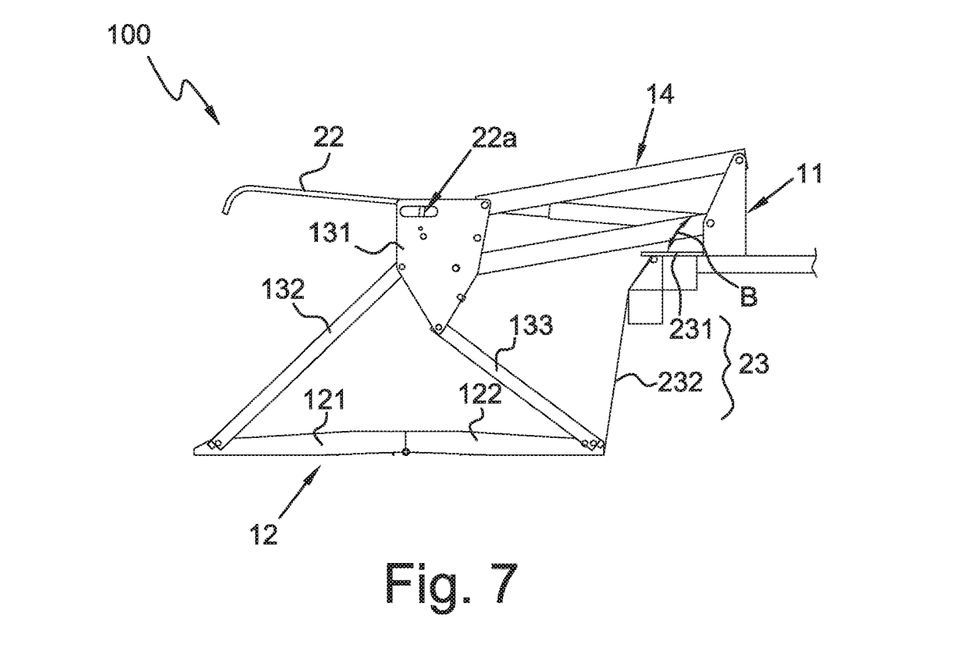
FIGS. 7 and 8 show the variant of FIG. 6 in an open configuration in a lateral and perspective view, respectively.
Figure 8:
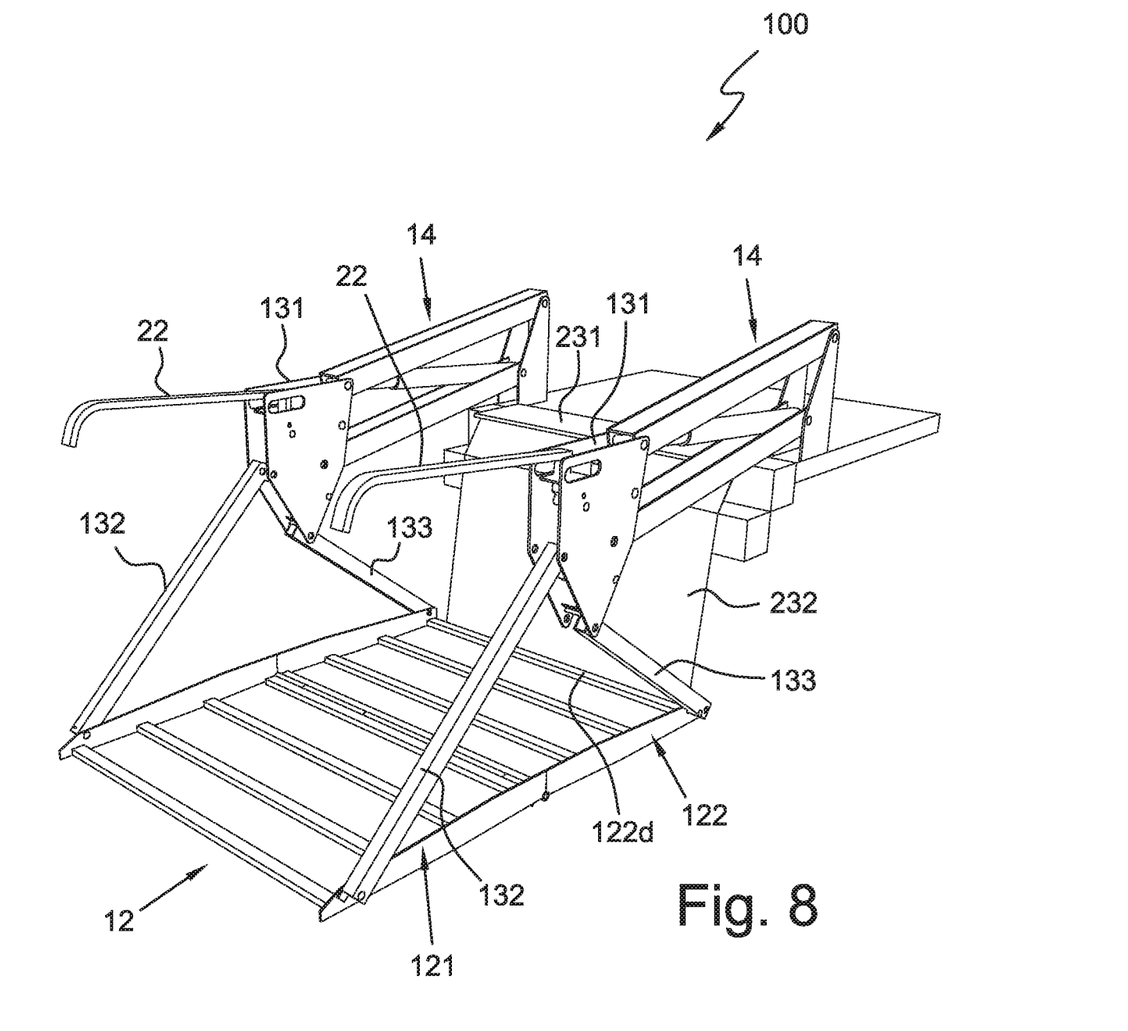

With particular reference to FIGS. 6, 7 and 8, these show a variant of the aforementioned lift apparatus 10 which is globally indicated by the reference 100.

This lift apparatus 100 differs from the lift apparatus 10 as following, therefore the elements already described in relation to the lift apparatus 10 are identified with the same references in the following description.

Structurally, in the present variant, the lift apparatus 100 differs from the lifting apparatus 10 in that the aforesaid actuating means, which are adapted to spread the parts 121, 122 of the platform 12, comprise an elastic member 150, which is preferably a helical traction spring, instead of the elastic element 15, or in cooperation with the latter.

The elastic member 150 is advantageously connected to the connecting element 131 and to the first connecting rod element 132 so as to exert an elastic force on the latter which tends to spread the first connecting rod element 132 from the second connecting rod element 133 so as to bring the platform 12 in the open configuration.

Clearly, the elastic member 150 could similarly be connected between being connected to the second connecting rod element 133 so as to exert on it an elastic force which tends to divaricate it with respect to the first connecting rod element 132 to bring the platform 12 into the open configuration.

Alternatively, two elastic members 150 are provided each connected to the support element 131 and to a corresponding connecting rod element 132 or 133.

In general, the lift apparatus 10 or 100 advantageously comprise at least one auxiliary handle 22 which is pivoted to the connecting element 131 and connected, preferably by a mechanism 22a, to one of the connecting rod elements 132 and 133 and preferably to the first connecting rod element 132 to switch between:

a folded configuration, for example visible in FIG. 6, in which the auxiliary handle 22 is brought down and compacted on the first connecting rod element 132; and an extended configuration in which, in use, it extends substantially horizontally or in any way suitable to provide support for the user.

The mechanism 22a is advantageously configured in such a way that when the platform 12 is in the close configuration, the auxiliary handle 22 is in the folded configuration and when the platform 12 is in the open configuration the auxiliary handle 22 is in the extended configuration, as exemplified in FIGS. 6 and 7, 8.

In a particularly advantageous embodiment of the present invention, the lift apparatus 10 or 100 advantageously also comprises a safety tent 23 comprising:

a base 231, preferably fixed to the anchor assembly, or fixable directly to the vehicle on which the lift apparatus is mounted; and a shield 232 extensible from the base 231 and fixed to the platform 12 to be extended from the base 231 when the platform 12 passes from the close configuration to the open configuration.

Preferably, the shield 232 has an edge fixed to the external edge 122d of the part 122 of the platform 12, closer to the arms 14.

The base 231 is advantageously which can oscillate with respect to the anchor assembly 11, for example as indicated by the arrow B of FIG. 7, so as to follow the movement of the platform 12 as it approaches the close configuration.

The safety tent 23 is advantageously configured in such a way that, when the platform is in the open configuration and the arms 14 are in the operating configuration, the shield 232 extends from the base 231 up to the platform 12 in such a way as to define a wall substantially vertical containment, as illustrated for example in FIGS. 7 and 8.

In the accompanying figures, the safety tent is shown integrated in the sole lift apparatus 10 but, clearly, it is preferably to be applied in general to the lift apparatus made in accordance with the present invention.

The invention thus conceived is susceptible of numerous modifications and variations, all of which are within the scope of protection of the appended claims.

Furthermore, all the details may be replaced by other technically equivalent elements.

In practice, the materials used, as well as the contingent shapes and dimensions, may be varied according to the contingent requirements and the state of the art.

Where the constructional features and techniques mentioned in the following claims are followed by signs or reference numbers, such reference marks or numbers have been affixed with the sole purpose of increasing the intelligibility of the claims themselves and, consequently, they do not constitute in no restriction on the interpretation of each element identified, purely by way of example, by such signs or reference numbers.

What is claimed is:

1. Lift apparatus (10) comprising:
at least an anchor assembly (11) fixable to the frame of a vehicle;
a platform (12) suitable to support a wheelchair;
at least a support assembly (13) mechanically connected to said platform (12);
two arms (14), each connected to said support assembly (13) to support said platform (12); said arms (14) being rotatably connected to said anchor assembly (11) to rotate with respect to the latter, between a rest configuration and an operating configuration;

wherein said platform (12) comprises two parts including a first part (121) and a second part (122), of which, each has a support surface (121*a*, 122*a*) for a wheelchair, a back (121*b*, 122*b*) opposite said support surface (121*a*, 122*a*) and a lateral edge (121*c*, 122*c*) along which said parts (121, 122) are mutually hinged to rotate mutually between a close configuration, in which the backs (121*b*, 122*b*) of said parts (121, 122)) are facing, and an open configuration in which the support surfaces (121*a*, 122*a*) of said parts (121, 122) are substantially coplanar to define a support plane for a wheelchair; wherein, when the lift apparatus (10) is in said open configuration, the second part (122) is interposed between the first part (121) and said anchor assembly (11), said lift apparatus (10) comprising actuating means to mutually rotate the first and second parts (121, 122) of said platform (12) from said close configuration to said open configuration and vice versa;

said support assembly (13) comprising, for each arm (14) of said arms (14):

a connecting element (131), pivoted to said arm (14);

a first connecting rod element (132) pivoted to said connecting element (131) and to the first part (121);

a second connecting rod element (133) pivoted to said connecting element (131) and to the second part 122;

said connecting rod elements (132, 133) being mutually coupled together when said platform (12) is in said close configuration and being divaricated from each other when said platform (12) is in said open configuration;

wherein, when said platform (12) is in the open configuration, said connecting element (131) is positioned above the platform (12), and a pivot location for the first connecting rod element (132) with the connecting element (131) is horizontally further from the anchor assembly (11) than a corresponding pivot location of the second connecting rod element (133) with the connecting element (131).

2. Lift apparatus (10) according to claim 1 characterized in that said actuating means are configured to mutually rotate the parts (121, 122) of said platform (12) from said close configuration to said open configuration following a rotation of said arms (14) from said rest configuration to said operating configuration, and from said open configuration to said close configuration following a rotation of said arms (14) from said operating configuration to said rest configuration.

3. Lift apparatus according to claim 1, characterized in that said actuating means comprise at least an elastic element (15) mechanically connected to each of said parts (121, 122) in such a way that when said platform (12) is in said close configuration, said elastic element (15) is in a first charged configuration and when said platform (12) is in said open configuration, said elastic element (15) is in a second charged configuration; said elastic element (15), when in said first charged configuration, is elastically deformed in such a way to exert an elastic force, on said parts (121, 122), the elastic force configured to promote a transition of the lift apparatus to the open configuration; when said elastic element (15) is in said second charged configuration, it is elastically deformed in such a way to exert a second elastic force on said parts (121, 122), the second elastic force configured to promote a transition of the lift apparatus to the close configuration.

4. Lift apparatus (10) according to claim 3 characterized in that said elastic element (15) comprises a rod or plate having two ends (15*a*, 15*b*), each of which is inserted in one of two corresponding seats (16*a*, 16*b*)), a first of that which is provided on the first part (121) of said platform (12) and the second one being provided on the second part (122) of said platform (12); said seats (16*a*, 16*b*) having first (161*a*, 161*b*) and second (162*a*, 162*b*) abutment elements arranged in such a way that said rod or plate pushes against said first abutment elements (161*a*, 161*b*), when it is in said first charged configuration and pushes against said second abutment elements (162*a*, 162*b*) when in said second charged configuration.

5. Lift apparatus (10) according to claim 1 characterized in that it comprises means for compacting the parts (121, 122) of said platform (12) to said arms (14) when said parts (121, 122) are in said close configuration and said arms (14) are in said rest configuration.

6. Lift apparatus (10) according to claim 5 characterized in that said means for compacting comprise:

at least a first appendix (17) projecting from at least one of said arms (14) and at least a second appendix (18) projecting from at least one of the parts (121, 122) of said platform (12), said first and second appendages (18) being configured and positioned in such a way that, in use, during a transition of said arm (14) from said operating configuration to said rest configuration said first and second appendices (18) interfere, to exercise on said platform (12) a force apt to mutually rotate the parts (121, 122) of said platform (12) to promote a transition of the latter from said open configuration to said close configuration;

at least a third appendix (19) projecting from at least a first (132) of said connecting rod elements (132, 133), and a fourth appendix (20) projecting from at least one of said arms (14); said third and fourth appendages (19, 20) being configured and positioned in such a way that, in use, during a transition of said arm (14) from said operating configuration to said rest configuration, said third and fourth appendages (19, 20)) mutually interfere so that, when said arms (14) are in said rest configuration, the backs (121*b*, 122*b*) of the parts (121, 122) of said platform (12), abut one on the other.

7. Lift apparatus (10) according to claim 1, characterized in that the connecting element (131) of said support assembly (13), in use, is positioned above sides (12*a*, 12*b*) of said platform (12) to support it from above.

8. Lift apparatus (10) according to claim 1, characterized in that said support assembly (13) is configured in such a way that, in use, the weight force of said platform (12) exerts a null resulting moment on said support assembly(13).

9. Lift apparatus (10, 100) according to claim 1, characterized in that it comprises a safety tent (23) comprising:

a base (231), fixable to said anchor assembly (11) or to a vehicle on which said lift apparatus (10) is mounted; and a shield (232) extensible from said base (231) and fixed to said platform (12) to be extended from said base (231) when said platform (12) passes from said close configuration to said open configuration;

said safety tent (23) being configured in such a way that, when said platform (12) is in the open configuration and said arms (14) are in said operating configuration, said shield (232) extends from said base (231) up to said platform (12) so as to define a substantially vertical containment wall.

10. Lift apparatus (10) according to claim 1, characterized in that, when the lift apparatus (10) is in said open configuration, said connecting element (131) is intersected by a vertical plane passing through a center of gravity of said platform (12).

\* \* \* \* \*